United States Patent [19]

Kato et al.

[11] Patent Number: 4,743,994
[45] Date of Patent: May 10, 1988

[54] ARRANGEMENT FOR POSITIONING A RECORDING DISC OF A DISC CARTRIDGE

[75] Inventors: Yoshitake Kato, Ibaragi; Hiroshi Maruyama, Toride, both of Japan

[73] Assignee: Hitachi Maxell, Ltd., Osaka, Japan

[21] Appl. No.: 829,217

[22] Filed: Feb. 14, 1986

[30] Foreign Application Priority Data

Feb. 16, 1985 [JP] Japan .................................. 60-27547
Feb. 16, 1985 [JP] Japan .................................. 60-27548
Mar. 19, 1985 [JP] Japan .................................. 60-53297
Sep. 9, 1985 [JP] Japan .................................. 60-197748

[51] Int. Cl.⁴ .............................................. G11B 23/03
[52] U.S. Cl. .................................................... 360/133
[58] Field of Search .......................................... 360/133

[56] References Cited

U.S. PATENT DOCUMENTS 4,445,157 4/1984 Takahashi .......................... 360/133

FOREIGN PATENT DOCUMENTS 2108309 5/1983 United Kingdom ................ 360/133

Primary Examiner—Robert S. Tupper
Attorney, Agent, or Firm—Birch, Stewart, Kolasch & Birch

[57] ABSTRACT

In a recording disc cartridge, a surface of a disc supporting plate to which surface the recording disc is secured is made as a contacting surface for detachably contacting with a reference surface of a disc drive device so as to easily and correctly position the recording disc relative to the reference surface of the disc drive.

17 Claims, 10 Drawing Sheets

ARRANGEMENT FOR POSITIONING A RECORDING DISC OF A DISC CARTRIDGE

BACKGROUND OF THE INVENTION

1. Field of the Invention

The present invention relates to a disc cartridge for recording information in a recording disc and more particularly to a recording disc comprising a mechanism for positioning the recording disc with a high accuracy.

2. Description of the Prior Art

There has been known to the public magnetic disc cartridges comprising a generally thin rectangular cartridge case and a flexible magnetic recording disc rotatably assembled in the cartridge case by means of a core member to which the recording disc is secured.

FIG. 1 shows a part of a conventional magnetic recording disc of the type mentioned above, in which a magnetic disc assembly 2 for recording and reproducing information is rotatably assembled in a cartridge case 1. The magnetic disc assembly 2 is comprised of a magnetic disc 3 for recording of annular shape, a disc supporting plate 4 of annular shape made of stainless steel plate and having the magnetic disc 3 secured on the outer peripheral edge of the plate 4, a cylindrical hub 5 made of plastic resin material, being provided on the inner peripheral edge of the disc supporting plate 4 by outsert molding, and an annular regulating rib 6 projected from the disc supporting plate 4 near the outer peripheral area of the disc supporting plate 4. The recording disc 3 is made of a base film 3a of polyester film and magnetic layers 3b which may be formed on one of the surfaces of the film 3a or formed on both surfaces as shown in FIG. 2.

Referring to FIG. 1 again, a disc drive assembly 8 of a disc drive device (not shown) is composed of a shaft 9, a disc supporting table 10 rotated with the shaft 9 and an annular permanent magnet 11 fitted to the disc supporting table 10. The disc supporting plate 4 is secured on the top surface of the disc supporting table 10, the top surface of which serves as a reference surface, by the magnetic force of the permanent magnet 11. Thus, the recording disc 3 can be placed in position in the direction of the thickness of the recording disc 3. The inner part of the lower surface of the disc supporting plate 4 serves as a contacting surface for contacting the reference surface of the disc supporting table 10 and the outer part of the upper surface of the disc supporting plate 4 serves as a securing surface for securing the inner peripheral portion of the recording disc 3.

As shown in FIG. 1, in the conventional disc cartridge, the contacting surface and the securing surface are formed on both opposite surfaces of the disc supporting plate 4. Therefore, the securing surface changes relative to the contacting surface depending on the error of the thickness of the disc supporting plate 4' resulting in changing the position of the recording disc 3. Since the amount of movement of the recording head of the disc drive device to the recording disc is controlled based on the reference surface of the disc supporting table 10, if the recording disc 3 is displaced by the error of the thickness of the disc supporting plate 4, the contact pressure of the recording head to the recording disc 3 changes, thereby contact between the recording head and the recording disc become worse.

On the other hand, in the conventional disc cartridge of the above type, the regulating rib 6 faces to the drive shaft insertion opening 12 of the cartridge case 1 so that the disc assembly 2 is prevented from being unduly displaced in the cartridge case 1 up to such extent that the recording disc is damaged by clash of the outer peripheral portion of the recording disc with the inner surface of the cartridge case 1 even if the disc cartridge is vibrated during transportation of the disc cartridge or the like.

Furthermore, the hub core 5 is comprised of V shaped regulating walls (not shown) in the drive shaft insertion opening 12 to center the drive shaft 9 relative to the center of the hub core 5. Also, the disc supporting plate 4 is clamped on the reference surface of the disc supporting table 10 by the magnetic force of the permanent magnet 11 defining the vertical position of the disc assembly 2.

In the conventional disc cartridge, the hub core 5 and the rib 6 are formed by separate members, the hub assembly being complicated in construction and therefore, reduction of the size and weight of the hub assembly is prevented.

Furthermore, the magnetic pulling portion of the permanent magnet 11 is formed in the space between the outer peripheral portion of the hub core 5 and the rib 6, however, as the disc cartridge is made small, the space for the magnet must be also reduced, therefore size of the magnet 11 must be reduced, thereby resulting in reduction of the force of clamping the recording disc 3.

The conventional disc drive apparatus is so arranged such that the position of the disc assembly 2 in the disc drive device in the vertical direction is constrained by the top surface of the disc supporting table 10 and the disc assembly is centered by engagement between the cylindrical surface of the spindle 9 and the V shaped walls of hub core 5. This means that the reference surfaces for positioning the disc assembly are made of combination of two individual members, therefore the reference surfaces change due to an error of size of each components per se and an assembling error, whereby a stable and accurate drive of the recording disc can not be assured.

SUMMARY OF THE INVENTION

An essential object of the present invention is to provide a recording disc assembly which assures a good and reliable head contact.

Another object of the present invention is to provide a recording disc cartridge which is able to reduce the size and thickness of the cartridge.

A further object of the present invention to provide a disc drive device which is able to position a recording disc assembly in position with a high accuracy.

According to the present invention there is provided a disc cartridge comprising:

a cartridge case:

a recording disc assembly rotatably accommodated in said cartridge case;

said recording disc assembly comprising a recording disc, a contacting surface for detachably contacting with a reference surface of a disc drive device and a disc supporting plate having a disc securing surface to which an inner peripheral edge of the recording disc is secured thereby supporting the recording disc, the contacting surface and securing surface being situated on the same surface of the disc supporting plate.

Moreover, according to the present invention, there is provided a disc drive device comprising; disc receiving means formed on the end portion of a spindle, the top face of the disc receiving means serving as a reference surface for defining the position of the recording disc in the thickness direction of the disc, and the outer surface of the disc receiving means serving as a reference surface of the recording disc in the radial direction of the recording disc.

DETAILED DESCRIPTION OF THE PREFERRED EMBODIMENTS

Referring to FIGS. 3 to 6, a magnetic disc cartridge comprises a cartridge case 1, magnetic disc assembly 2 and a shutter movably mounted on the cartridge case 1.

The cartridge case 1 is formed of a top half 1a and a bottom half 1b each being made of a generally flat and rectangular plate 1X (or 1Y) surrounded by vertical walls made of hard plastic resin materials such as ABS resin so that a generally thin flat square chamber to accommodate the disc assembly 2.

Figure 3:
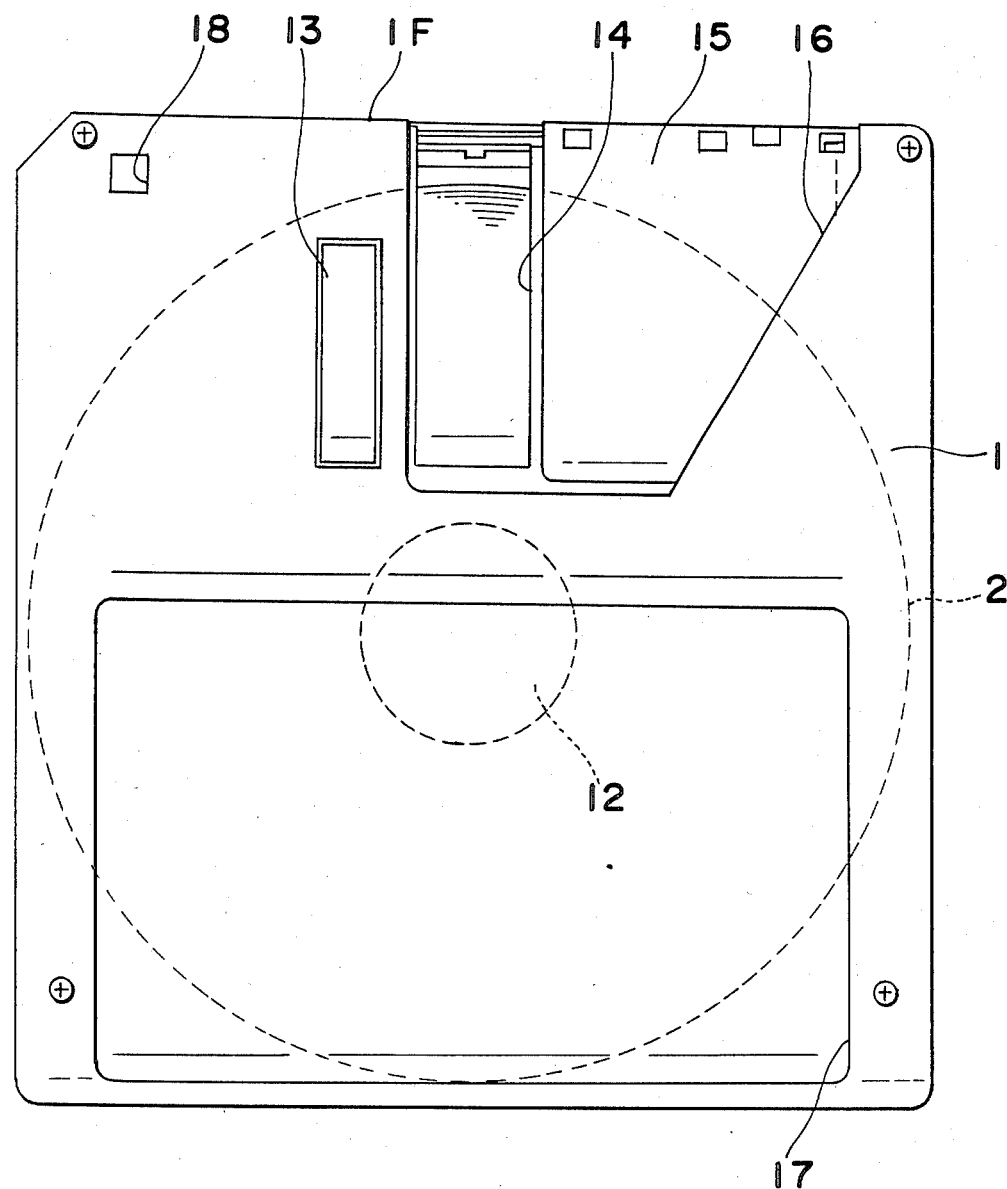
FIG. 3 is a top plan view showing recording disc cartridge according to the present invention.

In each of the top and bottom halves 1a and 1b is formed an elongated head insertion window 14 extending from near the central portion to near the front edge 1F of the cartridge case 1. The head insertion holes 12 are formed in the opposed position of the top and bottom halves 1a and 1b. The bottom half 1b is formed of a disc drive assembly insertion hole 12 of a round shape in the central portion of the cartridge case 1. Each of the top and bottom halves 1a and 1b is further formed of a recess 16 sank from the main surface of the cartridge case 1 with a generally trapezoid shape to which a shutter 15 is slidably mounted so as to close and open the head insertion hole 12 contained in the area of the recess 16. As shown in FIG. 3, an elongated pressing member 13 is formed in parallel with said head insertion holes 12 on a portion of upper stream of rotation of the recording disc 3 in top half 1a for resiliently moving inward and outward of the top half 1a so as to slidably depress the recording disc 3 through a cleaning sheet 30 (see FIG. 4) made of non woven fabric and laid on the inner surface of the top half 1a. A label fitting area 17 is provided on the surface of the top half 1a in the rear half portion, to which a label (not shown) can be fitted.

The disc assembly 2 rotatably accommodated in the chamber of the cartridge case 1 comprises the magnetic floppy disc 3 having an annular shape, a disc supporting plate 4 made of a stainless steel disc without any opening and a regulating rib 6 having a short and thin cylindrical shape formed by outsert molding so as coaxially to be secured to the lower surface of the disc supporting plate 4. The disc supporting plate may in the form of other metallic flat plates. Preferably the disc supporting plate is made of magnetic material. The regulating ring 6 may be formed of suitable plastic resin such as acetal resin. In the present embodiment, the inner peripheral portion of the recording disc 3 is fitted coaxially to the outer peripheral portion of the lower surface of the disc supporting plate 4. It is noted that the lower surface of the disc supporting plate 4 acts as a reference surface which detachably contacts with the top face of a disc supporting table 10 of the disc drive assembly 8, whereby the upper surface of the recording disc 3 can be flush with the top surface or the reference surface of the disc supporting table 10.

Figure 5:
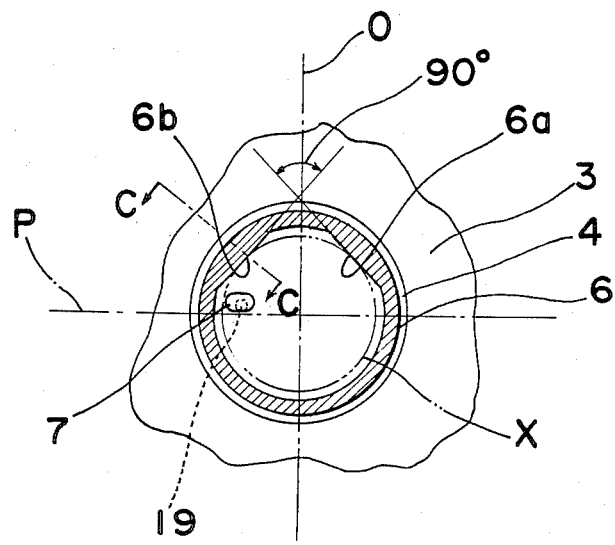
FIG. 5 is a partial top plan view showing an essential portion of a regulating rib used in the embodiment shown in FIG. 4.
Figure 6:
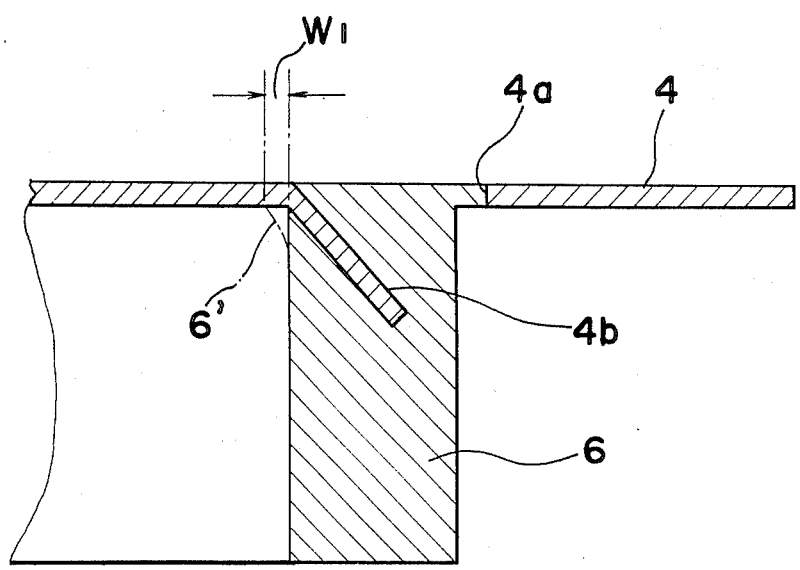
FIG. 6 is a cross sectional view showing a way of connection between a disc supporting plate and the regulation rib.
Figure 7:
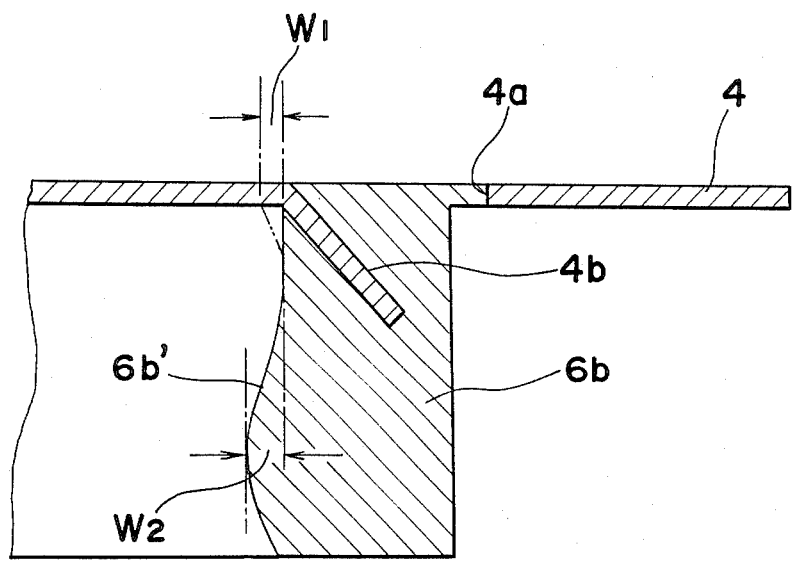
FIG. 7 is a modification of the way of connection shown in FIG. 6.
Figure 9:
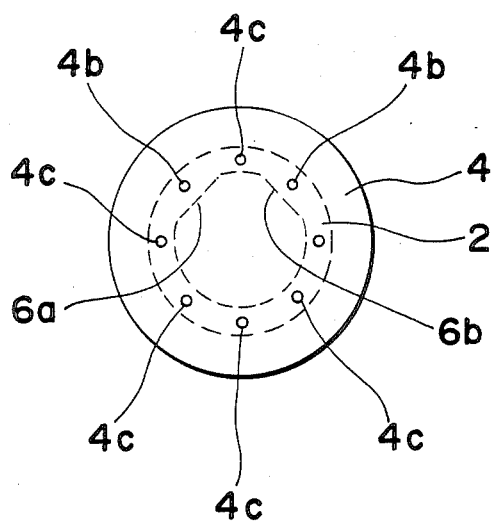
FIG. 9 is a top plan view of another embodiment of the disc supporting plate.
Figure 8:
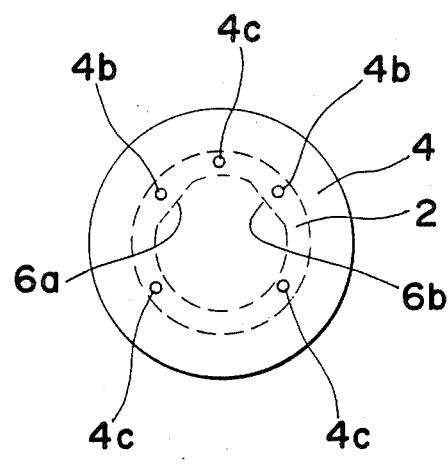
FIG. 8 is a top plan view of a disc supporting plate used in the embodiment shown in FIG. 4.

As shown in FIG. 5, the position regulating rib 6 has an annular shape having its inner cylindrical surface formed V-shaped walls 6a and 6b. Each of the walls 6a and 6b has a generally flat surface extending vertically and is disposed symmetrical with respect to the center line O of the regulating rib 6 on one half of the inner surface with respect to another center line P which is perpendicular to the first mentioned center line O. The V-shaped walls 6a and 6b are formed conforming to two tangent lines on a circle X corresponding to the outer cylindrical surface of the disc supporting table 10 of the disc drive device when the table 10 is placed coaxial with the regulating rib 6 the corner angle between both walls 6a and 6b is defined 45° to 120°. By the arrangement described above, the disc assembly 2 can be centered with the disc drive assembly 8. The regulating rib 6 is secured to the disc supporting plate 4 by outsert molding. (In case the opening 4a of the disc supporting plate 4 is formed by raising a part of the disc supporting plate 4 toward the reference surface of the disc supporting plate 4, then the mechanical strength of the regulating rib 6 can be reinforced.) It is noted that there tends to occur sagging 6' at the inner corner between the lower face of the disc supporting plate 4 and the inside of the regulating rib 6 to which the top portion of the disc drive assembly 8 is inserted. If the top portion of the disc drive assembly 8 is interfered with by the sagging 6', correct contact between the outer cylindrical wall of the disc supporting table 10 and the walls 6a and 6b is also interfered with, and the correct positioning of the disc assembly 2 can not be expected. Apparently, the work for removing the sagging 6' causes the productivity of the tape cartridges to be lowered. FIG. 7 shows a way of eliminating effect of the sagging 6', in which there are formed thick portions 6a' and 6b' (only 6b' is shown in FIG. 7) expanded inwardly on the lower half of the walls 6a and 6b of the regulating rib 6 with such an extent W2 larger than the maximum size W1 of the sagging 6 so that the outer cylindrical surface of the disc supporting table 10 engages with the thick portions 6a' and 6b' and the position of the disc assembly 2 can be decided by the thick portions 6a' and 6b' preventing from the bad effect of the sagging 6'. By this arrangement, even if there is sagging 6' on the regulating rib 6, the work for removing the sagging 6' is unnecessary.

Besides the problem of sagging mentioned above, there occurs shrink of the regulating rib 6 in the circumferential direction and radial direction in the process of curing the molded regulating rib 6 and the thickness of the regulating rib 6 may be decreased. In order to eliminate the above problem, it may be possible to form a plurality of connecting portions for connecting the regulating rib 6 and the disc supporting plate 4 (portions of the regulating rib corresponding to the openings 4a of the disc supporting plate 4) distributed with an equal angular space in the circumferential direction. However, in this arrangement, decrement of the thickness of the regulating rib 6 occurs in whole part of the rib 6, the geometric position of the both walls 6a and 6b may be different from the designated position due to decrement of the size of the regulating rib 6, whereby centering of the disc assembly 2 becomes difficult. In order to eliminate the drawback, according to the preferred embodiment shown, a greater number of joints 4c are formed in the area where the walls 6a and 6b are formed relative to the number of the joints 4b in the side corresponding to the annular portion of the regulating rib 6 so that the amount of shrinkage in the walls 6a and 6b of the regulating rib 6 during molding is less than the amount of shrinkage in other part of the regulating ring 6 so as to prevent the decrement of the thickness of the walls 6a and 6b. In securing the magnetic disc 3, the regulating rib 6 may serve to position the magnetic disc 3 in the radial direction. In this case, the regulating rib 6 is a rib centered with the center of the magnetic disc 3, the magnetic disc 3 can be positioned by fitting the regulating rib 6 in the central hole of the magnetic disc 3.

The regulating rib 6 is not limited to a single continued annular shape but may be discontinued separately in the circumferential direction.

A drive hole 7 is defined in a portion of the disc supporting plate 4 surrounded by the regulating ring 6. The drive hole 7 has an elongated shape along the center line P as shown in FIG. 5 so as to receive a drive pin 19 of the disc drive device.

Figure 10:
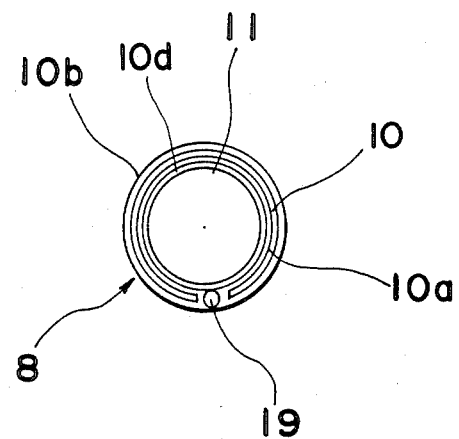
FIG. 10 is a top plan view of a disc drive member of a disc drive device
Figure 11:
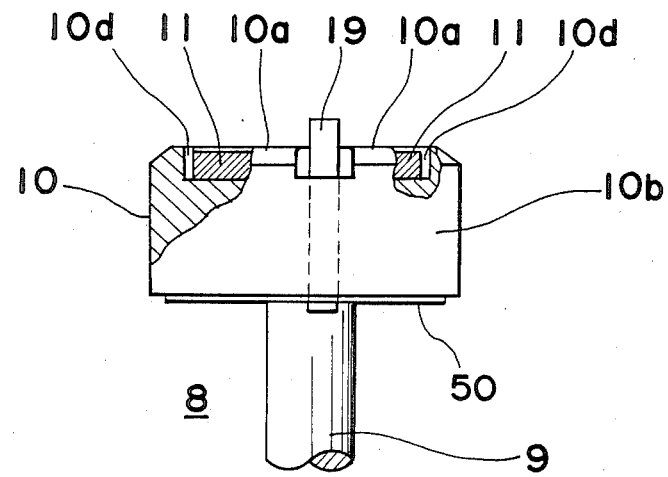
FIG. 11 is a partial side view of the disc drive member shown in FIG. 10, FIGS. 12(a) and 12(b) are respectively top plan views of the disc supporting plate.

As shown in FIGS. 10 and 11, the disc drive assembly 8 comprises a rotational spindle 9 which is driven by a motor (not shown) of the disc drive device. The disc supporting table 10 in a generally saucer shape is fixed to the top of the spindle 9. The disc supporting table 10 has a round recess 10d surrounded by an annular peripheral wall 10e formed on the top portion of the disc supporting table 10 with the top annular surface 10a made flat to contact with the disc supporting plate 4. A permanent magnet 11 of a disc shape made of KS steel, MK steel, OP magnet, or ALNICO magnet contained in the recess 10d formed in the upper surface of the disc supporting table 10. A drive pin 19 is mounted on the disc supporting table 10 so as to move in the vertical direction between a position projected from the top surface of the disc drive member 10 as shown in FIG. 11 and a retracted position downwardly drawn from the top surface of the disc supporting table 10. The drive pin 19 is normally biased to the projected position by a resilient member 50 resiliently movably attached to the bottom face of the disc supporting table 10.

Figure 20:
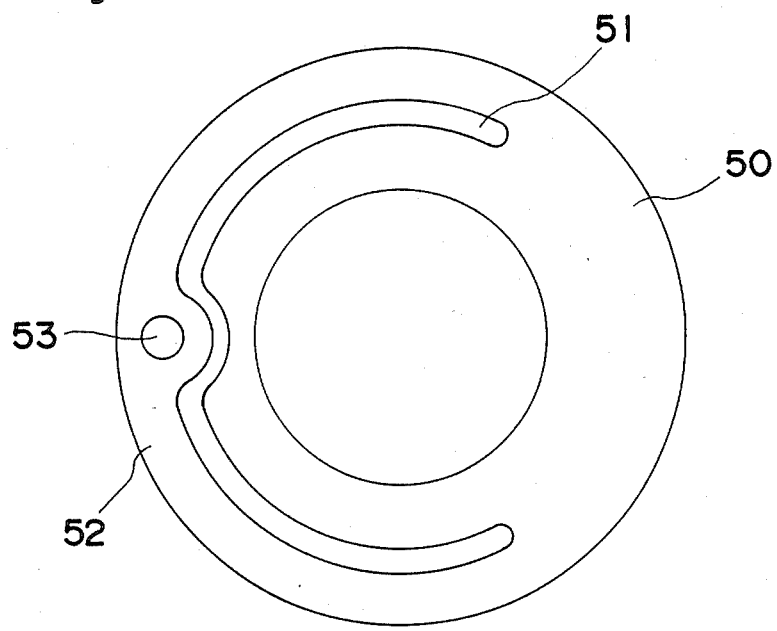
FIG. 20 is a top plan view of a resilient member for supporting a disc drive pin.

As shown in FIG. 20, the half of the outer peripheral portion of the resilient member 50 is made as a movable spring plate 52 separated by an arcuated cut portion 51. The lower end portion of the drive pin 19 is inserted into a round hole 53 defined in the movable spring plate 52 and secured thereto. The resilient member 50 is fitted to the lower surface of the disc supporting table 10 other than the movable spring plate 52 so that the spring plate 52 can be resiliently moved in the downward direction.

The top surface 10a of the disc supporting table 10 is projected about 0.1 mm to 0.2 mm from the top surface of the permanent magnet 11 for positioning the disc assembly 2 in the disc drive device. The outer cylindrical surface 10b of the disc supporting table 10 serves to center the disc assembly 2 in association with the regulating rib 6 of the disc assembly 2. The outer diameter of the disc supporting table 10 is slightly smaller than the inner diameter of the regulating rib 6 and substantially equal to the diameter of the circle X shown in FIG. 5.

Figure 4:
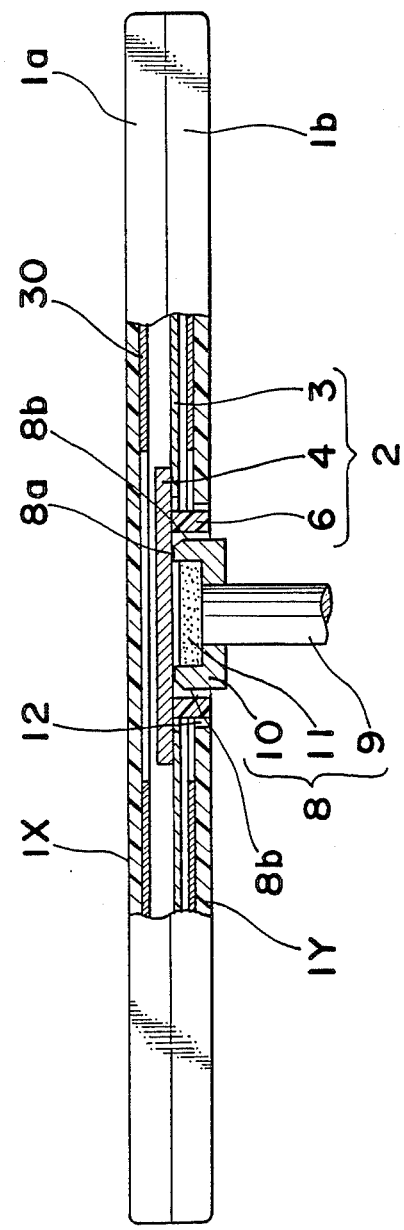
FIG. 4 is a partial cross sectional view showing an essential portion of a recording disc cartridge shown in FIG. 3.

In the arrangement mentioned above, upon insertion of the disc drive assembly 8 into the inner space of the regulating rib 6 through the disc drive shaft insertion hole 12 of the disc cartridge 1, the disc supporting plate 4 is fixedly placed on the top surface 10a of the disc supporting table 10 by the force of the magnet 11 for positioning the disc assembly 2 in the vertical direction. Also the disc assembly 2 is centered by the contact of the cylindrical surface 10b of the disc supporting table 10 with the flat walls 6a and 6b of the regulating rib 6 as shown in FIG. 4.

When the disc assembly 2 is mounted on the disc supporting table 10, if the disc drive pin 19 is not inserted in the drive hole 7 of the disc supporting plate 4, the disc drive pin 19 is retracted from the upper surface of the disc supporting table 10 against the force of the resilient member 50. Subsequently when the disc drive pin 19 comes to the disc drive hole 7 upon rotation of the disc drive assembly 8, the disc drive pin 19 is projected into the disc drive hole 7 by the force of the spring plate 52 so that the rotation of the spindle 9 is transferred to the disc assembly 2, which is rotated.

Figure 12A:
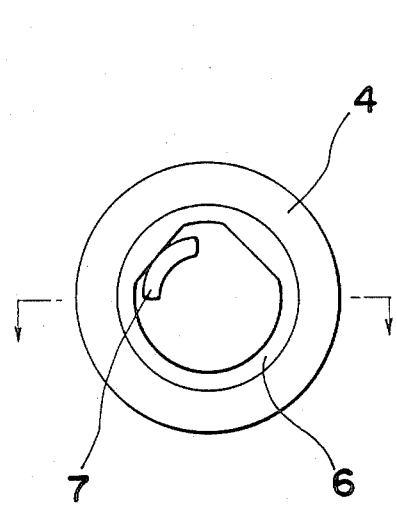

In place of defining the disc drive hole 7, any engaging member such as a blind recess or projection may be used for engagement between the disc supporting plate 4 and the disc drive assembly 8. In case the drive hole 7 is formed an elongated arcuate shape as shown in FIG. 12a, it is possible to engage the drive pin 19 in the drive hole 7, ensuring to start rotation of the disc assembly 2 rapidly.

Figure 12B:
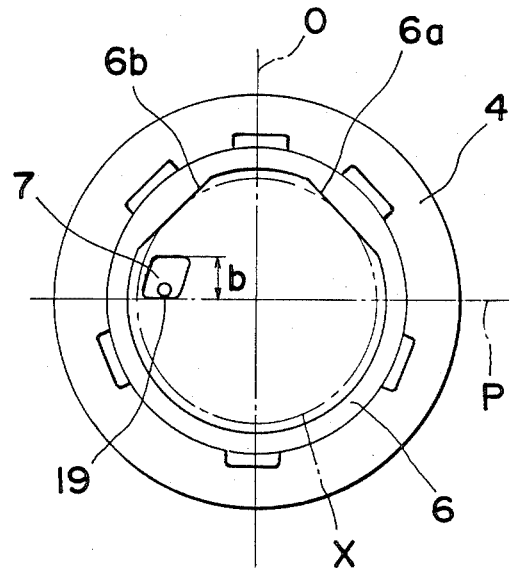
Figure 13:
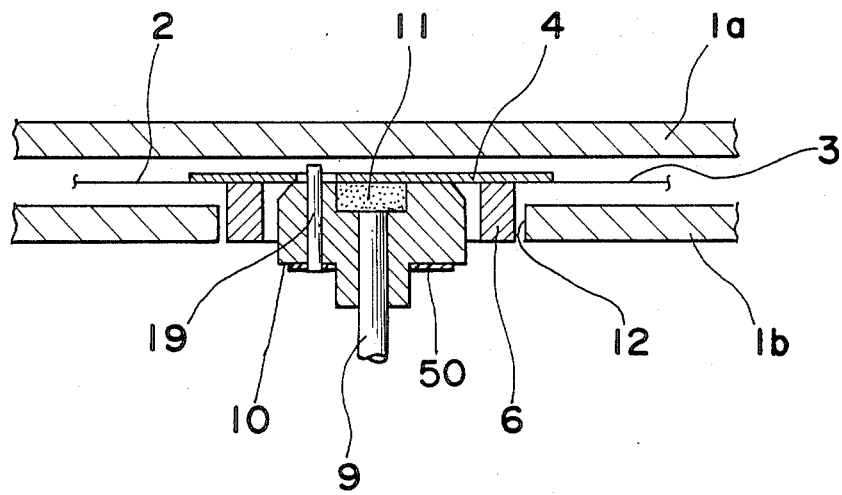
FIG. 13 is a partial cross sectional view showing the central portion of the disc cartridge according to the present invention

The drive hole 7 may be formed with the length b larger than twice the diameter d of the drive pin 19 as shown in FIG. 12(b). In one example, the length b is 2.0 mm for the diameter 0.8 mm of the drive pin 19 and b/d=2.5. By this arrangement the drive pin 19 can be surely and correctly fitted in the drive hole 7 even if the rotational speed of the disc supporting table 10 is more than 600 r.p.m. In case the drive hole 7 is expanded as shown in FIG. 12(a), it becomes easy to fit the drive pin 19 in the drive hole 7. However the longer the drive hole, the weaker the mechanical strength of the disc supporting plate 4, therefore the upper limit of the length of the drive hole may be a quarter of a circumference. In considering the outsert molding of the regulating rib 6 with the disc supporting plate 4, it is necessary to consider the effect of the drive hole 7 to the flat walls 6a and 6b, thus preferably the value b/d may be selected 2.0 to 3.0. The shape of the drive hole 7 is not limited to a square but may be selected in the desired shape such as a trapezoidal shape.

Although the present invention is described with reference to the embodiment of the magnetic recording disc, the present invention can be applied to optical recording discs or the like.

Furthermore, the permanent magnet is used as the mechanism for clamping the disc assembly 2, any other clamp mechanism may be used. For example, a through hole is defined on the upper portion of the disc supporting plate 4 corresponding to the drive shaft insertion hole 12, so that the disc assembly 2 is clamped by a clamping means entered to the disc supporting plate 4 through the through hole.

In case the disc assembly having the permanent magnet 11 in the disc supporting plate 10 fixed to the spindle 9 is used, the magnetic drawing portion i.e., the permanent magnet 11 in the example shown, can be expanded as large as possible without limitation of the size of the spindle so as to increase the clamping force, thereby enabling to prevent wearing of the flat walls 6a and 6b of the regulating rib 6.

Moreover, although the outer surface of the disc supporting table 10 is a cylindrical shape, the disc supporting table 10 may have a generally square shape in top plan view.

In the embodiment mentioned above, the top end portion of the drive pin 19 is projected through the disc supporting plate 4 toward the inner surface of the top half 1a, in case the top half 1a is deformed, there may occur undesired clash of the drive pin 19 with the top half during rotation of the drive pin 19, thereby resulting in bad effects on rotation of the disc assembly 2 and wearing of the case body in addition to occurrence of error of reading and/or writing of the information in the recording disc.

Figure 14:
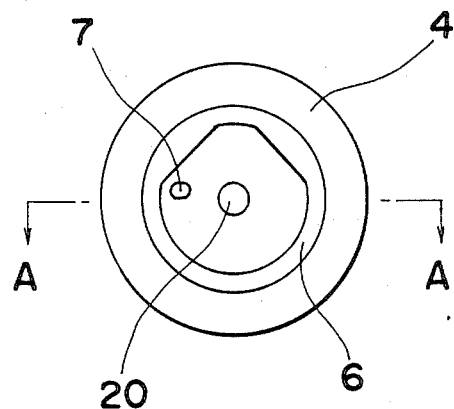
FIG. 14 is a top plan view of the disc supporting plate.
Figure 15:
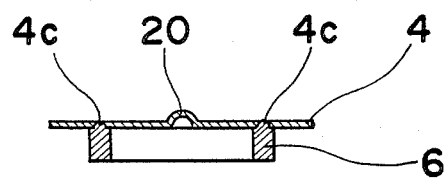
FIG. 15 is a cross section taken along the lines A—A.
Figure 16:
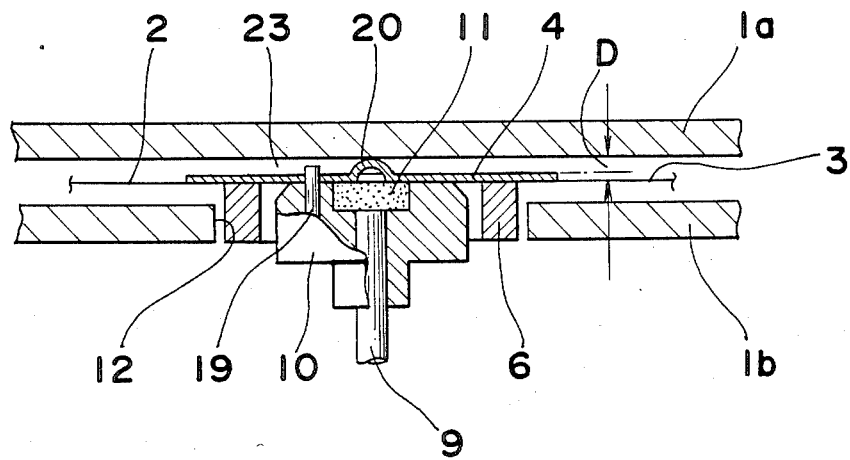
FIG. 16 is a cross sectional view showing a central portion of another embodiment of the disc cartridge to which the disc supporting plate shown in FIG. 14 is used.

In order to prevent undesired engagement between the drive pin 19 and the cartridge case 1, a spacer may be formed on any of the top half 1a or disc assembly 2 to develop a gap therebetween. FIGS. 14 through 16 show one embodiment therefore, in which there is formed a projection 20 on the disc supporting plate 4 upside in the central portion. The top end of the projection 20 is close to the inner surface of the top half but not contacts thereto when assembled. The level of the top end of the projection 20 when assembled is so defined that there can be maintained a space 23 with at least length D between the lower surface of the of the disc supporting plate 4 and the inner surface of the top half 1a so as to prevent clash of the top end of the drive pin 19 with the inner surface of the top half 1a. The projection 20 is formed of a hollow semi spherical shape so that only the top end point contacts with the inner surface of the top half 1a even if the top half 1a is deformed for assuring a smooth rotation of the disc assembly 2.

Figure 17:
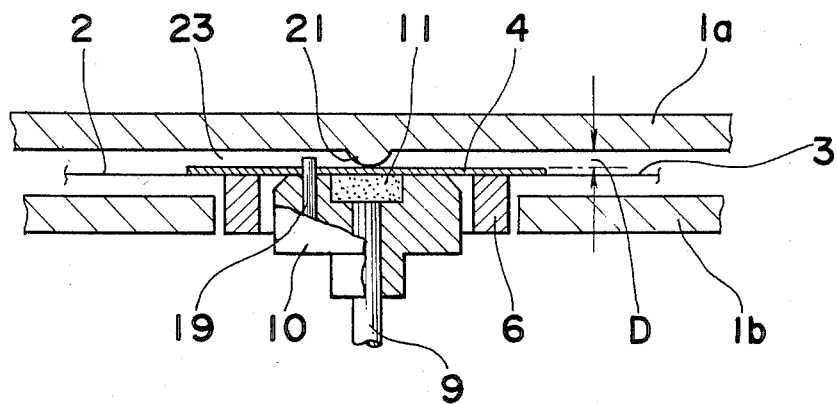
FIG. 17 is a cross sectional view showing a central portion of a further embodiment of the disc cartridge according to the present invention.

FIG. 17 shows a modification of the mechanism for preventing clash of the disc supporting plate 4 with the top half 1a in which a projection 21 similar to the projection 11 is formed on the top half 1a downward. In this case the vertical length of the projection 21 is so defined that the length D of the space 23 can be maintained for preventing engagement of the disc supporting plate 4 with the top half 1a.

Figure 18:
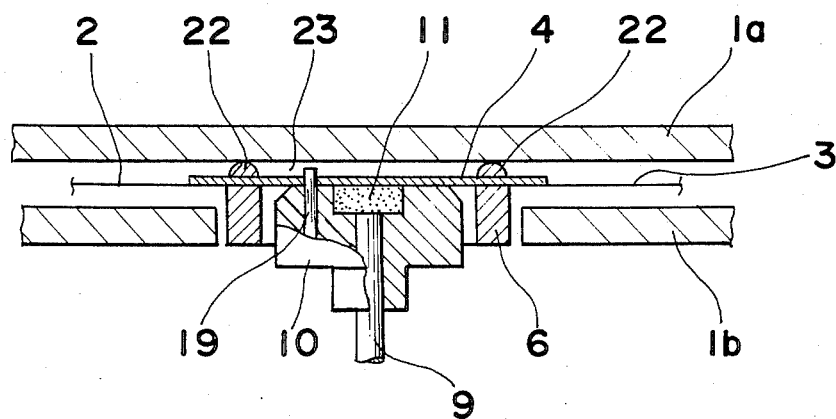
FIG. 18 is a cross sectional view showing a central portion of a still further embodiment of the disc cartridge according to the present invention.

FIG. 18 shows a further modification of the mechanism for preventing the engagement between the disc supporting plate 4 and top half 1a in which a plurality of projections 22 are formed on the upper surface of the disc supporting plate 4 i.e., the surface opposite to the surface on which regulating rib 6, in other word the surface facing to the inner surface of the top half 1a, generally along the line X (see FIG. 5) which corresponds to the circle of the regulating rib 6. The projections 22 may be formed independent of the regulating rib 6. However, the projections may be formed integral with the regulating rib 6 by projecting foot portions of the regulating rib 6 toward the opposite side of the disc supporting plate 4 through the openings 4b and 4c provided for securing the rib 6 to the disc supporting plate 4. This method may be effective to simplify the work of making the projections 22. The position of the projections 22 may be selected as desired on the upper surface of the disc supporting plate 4. Also the projections may be formed on the inner surface of the top half 1a.

Figure 1:
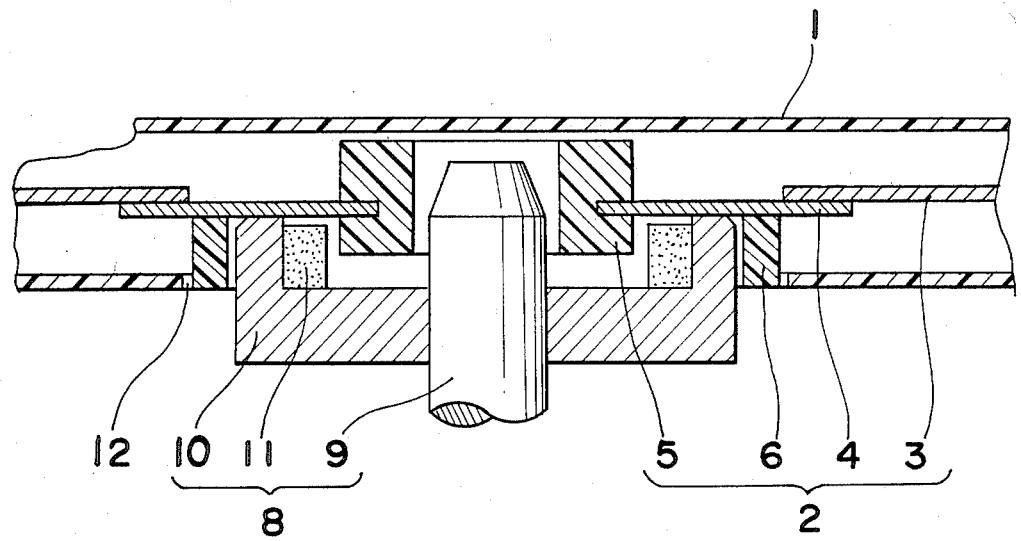
FIG. 1 is a cross sectional view of an essential portion of a conventional disc assembly.
Figure 2:
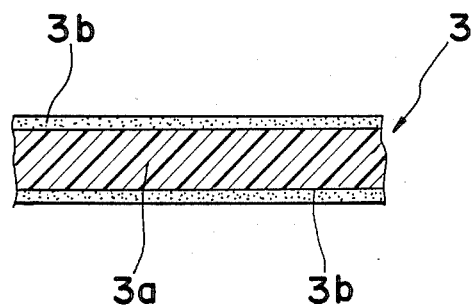
FIG. 2 is a cross sectional view showing a recording disc used in the disc assembly shown in FIG. 1.
Figure 19:
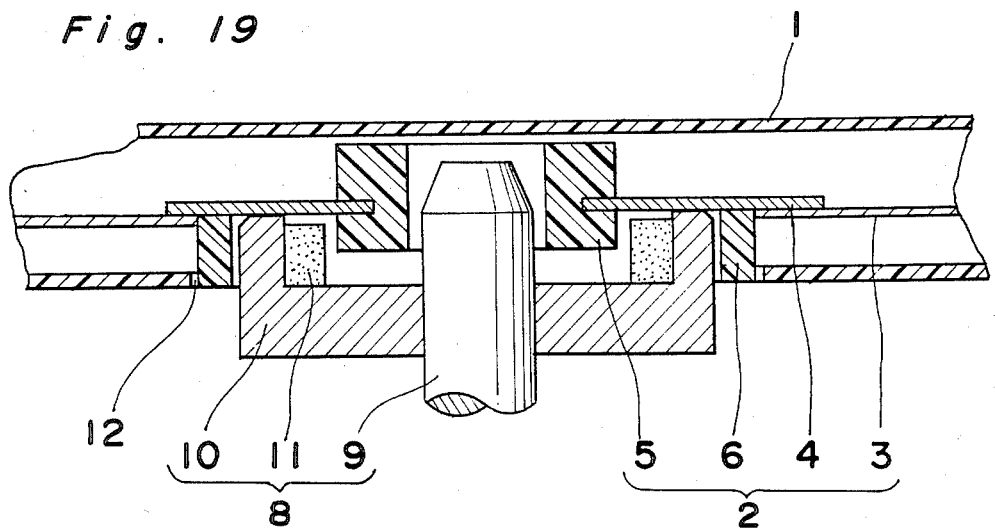
FIG. 19 is a still further embodiment of the disc cartridge according to the present invention.

FIG. 19 shows a further embodiment of the disc cartridge according to the present invention in which the disc assembly 2 is formed in a similar manner as shown in FIG. 1 except for that the recording disc 3 is secured to the lower surface of the disc supporting plate 4 so that the surface of the recording disc 3 coincides with the top surface of the disc supporting table 10.

It is an advantage of the disc cartridge according to the present invention that the bad effect due to the error of the thickness of the disc supporting plate since the reference surface of the disc supporting table and the recording surface of the recording disc are generally coincided, whereby contact of the recording or reproduced head with the recording disc can be maintained so that a high reliability of recording and reading can be assured.

What is claimed is:

1. A disc cartridge comprising:
    a cartridge case;
    a recording disc assembly rotatably accommodated in said cartridge case, said recording disc assembly including
    a disc having a central hole and an inner peripheral edge,
    a disc support plate having a first face, a contacting surface on the central portion of said first face for detachably contacting a disc drive assembly, and a disc securing surface on the outer peripheral portion of said first face to which said inner peripheral edge of said recording disc is secured thereby supporting said recording disc, and
    an annular positioning rib means for regulating the position of said recording disc assembly in a radial direction, said annular positioning rib means being formed coaxial to said disc support plate and secured to said first face of said disc support plate, and said annular positioning rib means having an outer cylindrical wall that is secured within said central hole of said recording disc, wherein said contacting surface and said securing surface of said disc support plate are coplanar.

2. The disc cartridge according to claim 1, wherein said disc support plate comprises a metal plate.

3. The disc cartridge according to claim 2, wherein said disc support plate comprises a magnetic metal plate.

4. The disc cartridge according to claim 3, wherein said disc support plate comprises a flat stainless steel plate.

5. The disc cartridge according to claim 1, wherein said disc support plate comprises a flat round plate.

6. The disc cartridge according to claim 5, wherein said disc supporting plate comprises a flat magnetic metal plate.

7. The disc cartridge according to claim 1, wherein a cartridge case;

a recording disc assembly rotatably accommodated in said cartridge case;

said recording disc assembly comprising recording disc, a contacting surface for detachably contacting with a reference surface of a disc drive device and a disc supporting plate having disc securing surface to which an inner peripheral edge of the recording disc is secured thereby supporting the recording disc, and rib means disposed on the supporting plate for regulating the position of the recording disc assembly in a said annular positioning rib means includes an inner cylindrical wall having first and second inner flat walls formed thereon wherein said first and second inner flat walls are arranged in a V character shape in plan view for abutting to a part of a cylindrical surface of said disc drive assembly to position the center of said recording disc assembly when said recording disc assembly is rotated.

8. The disc cartridge according to claim 7, wherein said recording disc assembly includes engaging means disposed in said central portion of said disc support plate for engaging with a drive pin of said disc drive assembly to rotate said recording disc assembly.

9. The disc cartridge according to claim 8, wherein said disc supporting plate comprises a magnetic metal plate.

10. The disc cartridge according to claim 8, wherein said disc support plate includes a second face opposite said first face having a plurality of plate projections contacting said cartridge case for defining a space between said disc support plate and the inner surface of said cartridge case and for preventing contact between said cartridge case and said driving pin of said disc drive assembly.

11. The disc cartridge according to claim 10, wherein said disc support plate includes one plate projection formed in the central portion of said disc support plate.

12. The disc cartridge according to claim 8, wherein the inner surface of said cartridge case includes at least one case projection contacting said recording disc assembly for defining a space between said recording disc assembly and the inner surface of said cartridge case and for preventing contact between said cartridge case and said driving pin of said drive disc assembly.

13. The disc cartridge assembly according to claim 8, wherein said engaging means comprises a drive hole formed in said disc support plate in the portion within said annular positioning rib means and wherein the ratio of the length b of said drive hole to the diameter d of said driving pin b/d is from 2.0 to 3.0.

14. The disc cartridge assembly according to claim 7, wherein the vertex of said V character shape formed by said first and second inner flat walls is outside said inner cylindrical wall of said annular positioning rib means and wherein said vertex has an angle of from 45° C. to 120° C.

15. The disc cartridge according to claim 7, wherein said annular position rib means comprises a rib formed from a plastic resin.

16. The disc cartridge according to claim 7, wherein said annular positioning rib means is joined to said disc support plate by a plurality of joints to prevent said annular positioning rib means from becoming improperly aligned.

17. The disc cartridge according to claim 7, wherein said first and second inner flat walls include thick portions for preventing said disc support plate and said annular positioning rib means from sagging.

* * * * *